US012791805B2

(12) United States Patent
Knickerbocker et al.

(10) Patent No.: US 12,791,805 B2
(45) Date of Patent: Nov. 10, 2026

(54) CO-PACKAGE OPTICS ASSEMBLY

(71) Applicant: International Business Machines Corporation, Armonk, NY (US)

(72) Inventors: John Knickerbocker, Monroe, NY (US); Qianwen Chen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 18/107,299

(22) Filed: Feb. 8, 2023

(65) Prior Publication Data

US 2024/0264392 A1 Aug. 8, 2024

(51) Int. Cl.
*G02B 6/42* (2006.01)

(52) U.S. Cl.
CPC ......... *G02B 6/4277* (2013.01); *G02B 6/4239* (2013.01)

(58) Field of Classification Search
CPC ............................ G02B 6/4277; G02B 6/4239
See application file for complete search history.

(56) References Cited

U.S. PATENT DOCUMENTS

| | | | |
|---|---|---|---|
| 8,534,927 | B1 | 9/2013 | Barwicz et al. |
| 8,545,108 | B1 | 10/2013 | Barwicz et al. |
| 8,678,666 | B2 | 3/2014 | Scadden et al. |
| 8,752,283 | B2 | 6/2014 | Barwicz et al. |
| 8,932,956 | B2 | 1/2015 | Barwicz et al. |
| 8,994,177 | B2 | 3/2015 | Barwicz et al. |
| 9,316,796 | B2 | 4/2016 | Barwicz et al. |
| 9,364,925 | B2 | 6/2016 | Barwicz et al. |
| 9,400,356 | B2 | 7/2016 | Barwicz et al. |
| 9,417,404 | B1 | 8/2016 | Barwicz et al. |
| 9,429,718 | B1 | 8/2016 | Barwicz et al. |
| 10,114,178 | B2 | 10/2018 | Verheyden et al. |
| 10,224,229 | B2 | 3/2019 | Andry et al. |
| 10,381,255 | B2 | 8/2019 | Andry et al. |
| 11,092,762 | B2 | 8/2021 | Hjartarson et al. |
| 11,121,005 | B2 | 9/2021 | Andry et al. |
| 11,239,377 | B2 | 2/2022 | Byrd et al. |
| 11,362,077 | B2 | 6/2022 | Chang et al. |
| 2002/0057872 | A1 | 5/2002 | Nishikawa |
| 2013/0283584 | A1 | 10/2013 | Barwicz et al. |

(Continued)

FOREIGN PATENT DOCUMENTS

WO 2015176049 A1 11/2015

*Primary Examiner* — Michael P Mooney
(74) *Attorney, Agent, or Firm* — Scully, Scott, Murphy & Presser, P.C.; Kristofer Haggerty

(57) ABSTRACT

Co-package optics structures are provided in which an electromagnetic radiation absorption material layer is used to attach an optical link and/or waveguide structure to a coupling area that is located on a photonic integrated chip. The electromagnetic radiation absorption material layer can provide permanent or a non-permanent attachment between the optical link and/or waveguide structure and the coupling area of the photonic integrated chip. In the non-permanent embodiment, testing can be performed to determine whether the optical link and/or waveguide structure is defective, and if determined to be defective, the defective optical link and/or waveguide structure can be replaced by a replacement optical link and/or waveguide structure by removing the electromagnetic radiation absorption material layer that attaches the defective structure.

19 Claims, 3 Drawing Sheets

(56) References Cited

U.S. PATENT DOCUMENTS

| | | | | |
|---|---|---|---|---|
| 2021/0048587 | A1 | 2/2021 | DeNoyer et al. | |
| 2021/0223489 | A1 | 7/2021 | Weng et al. | |
| 2022/0029712 | A1* | 1/2022 | Marrapode | G02B 6/4218 |
| 2024/0012199 | A1* | 1/2024 | Liu | G02B 6/122 |

* cited by examiner

CO-PACKAGE OPTICS ASSEMBLY

BACKGROUND

The present application relates to semiconductor technology, and more particularly to a co-package optics structure.

Communication systems and data centers are required to handle massive data at ever increasing speeds and ever decreasing costs. To meet these demands, optical fibers and optical integrated circuits (ICs), such as, for example, a photonic integrated circuits or integrated optical circuits, are used together with high speed electronic ICs. Such structures can be referred to herein as a co-package optics structure (or assembly).

The coupling of the photonic integrated circuits to optical fibers is not as well advanced as the integration and/or coupling of electronic ICs. Specifically, the challenges facing optical connections are different and much more complex than connecting electronic ICs to, for example, a printed circuit board. Some difficulties are inherent in wavelength, signal losses, assembly tolerance, and polarization characteristics of optical packaging.

Additionally, there is a need to drive co-package optics to support high bandwidth artificial intelligence (AI), cloud and edge computing, and high performance computing (HPC) and high speed, high bandwidth digital/electronic links and high speed, high bandwidth optical communications, each at low energy such as less than 0.1 to 1 picojoules/bit to support AI needs. Co-package optical links with electrical and optical integration on a module can provide the next generation increase in bandwidth communications at lower energy for communication links. For digital/electrical communications, this is both on module and off module, but at short reach distances of typically less than 0.1 to 0.2 meters (m) on module and up to 1-2 m off module. For optical communications, distances such as medium reach of 1 to 10 in and for long reach of 10's meters to 100's of kilometers may be used for AI/HPC and long distance tele-communications, as examples, respectively.

SUMMARY

Co-package optics structures are provided in which an electromagnetic radiation absorption material layer is used to attach an optical link and/or waveguide structure to a coupling area that is located on a photonic integrated chip. The electromagnetic radiation absorption material layer can provide permanent or a non-permanent attachment between the optical link and/or waveguide structure and the coupling area of the photonic integrated chip. In the non-permanent embodiment, testing can be performed to determine whether the optical link and/or waveguide structure is defective, and if determined to be defective, the defective optical link and/or waveguide structure can be replaced by a replacement optical link and/or waveguide structure by removing the electromagnetic radiation absorption material layer that attaches the defective structure.

In one aspect of the present application, a co-package optics structure is provided. In a first embodiment of the present application, the co-package optics structure includes a photonic integrated chip that includes at least one coupling area; an electromagnetic radiation absorption material layer located in close proximity to the at least one coupling area; and an optical link contacting the electromagnetic radiation absorption material layer that is present in close proximity to the at least one coupling area. In the present application, the electromagnetic radiation absorption material layer is compatible with the other elements of the co-package optics structure such that all the components of the co-package optics structure work together in permanent or rework usages.

In some embodiments of the present application, the electromagnetic radiation absorption material layer that is present in this first embodiment is a release layer. By release layer, it is meant that the electromagnetic radiation absorption material layer can be removed during a rework process such that a defective optical link can be easily replaced with a replacement optical link. In some embodiments, the electromagnetic radiation absorption material layer can be composed of carbon, titanium, aluminum, copper, or any combination thereof or alternate materials having high lambda absorption from targeted wavelength of electromagnetic radiation to cause ablation and/or removal of a defective component.

In some embodiments of the present application, the co-package optics structure of this first embodiment can further include an adhesive located between the electromagnetic radiation absorption material layer and the optical link. In such an embodiment, the adhesive can include a polyimide based adhesive or an epoxy based adhesive. The adhesive layer provides added adhesion of the optical link to the at least one coupling area.

In some embodiments of the present application, the electromagnetic radiation absorption material layer that is present in the first embodiment is an adhesive having electromagnetic radiation absorption particles embedded in a polymer matrix. In such embodiments, the electromagnetic radiation absorption particles can comprise, but are not limited to, carbon particles, titanium particles, aluminum particles, copper particles or any combination thereof.

In some embodiments of the present application, the optical link of the first embodiment is a glass fiber.

In some embodiments of the present application, the photonic integrated chip of the first embodiment can include at least one other coupling area located therein, wherein a replacement optical link or a waveguide array is present in the at least one other coupling area and adhered to a surface of the at least one other coupling area by a coupling material. The coupling material can be another electromagnetic radiation absorption material layer, adhesive or a combination thereof.

In a second embodiment of the present application, a co-package optics structure is provided that includes at least one coupling area located in a photonic integrated chip; an electromagnetic radiation absorption material layer located on a first surface of the photonic chip and in close proximity to the at least one least one coupling area; and at least one waveguide structure contacting the electromagnetic radiation absorption material layer that is present on the first surface of the photonic chip and in close proximity to the at least one coupling area.

In some embodiments of the present application, the electromagnetic radiation absorption material layer present in the second embodiment is a release layer. In some embodiments, the electromagnetic radiation absorption material layer can be composed of carbon, titanium, aluminum, copper or any combination thereof.

In some embodiments of the present application, the co-package optics structure of the second embodiment can further include an adhesive located between the electromagnetic radiation absorption material layer and the at least one waveguide structure. In such embodiments, the adhesive is a polyimide based adhesive or an epoxy based adhesive.

In some embodiments of the present application, the electromagnetic radiation absorption material layer that is present in the second embodiment is an adhesive having electromagnetic radiation absorption particles embedded in a polymer matrix. In such embodiments, the electromagnetic radiation absorption particles comprise carbon particles, titanium particles, aluminum particles, copper particles or any combination thereof.

In some embodiments of the present application, the at least one waveguide structure of the second embodiment is a fan-out optical waveguide structure.

In some embodiments of the present application, the at least one waveguide structure of the second embodiment is a polymer optical waveguide, a glass waveguide, a silicon dioxide waveguide, a silicon nitride waveguide or any combination thereof.

In some embodiments, the co-package optics structure of the second embodiment can further include another waveguide structure and a stiffener layer located above the at least one waveguide structure.

In some embodiments of the present application, the photonic integrated chip of the second embodiment can further include at least one photonic integrated chip including at least one coupling area, wherein one or more glass fibers or at least one other waveguide structure is adhered to a surface of the at least one other coupling area by a coupling material or fusion material such as an organic material or inorganic material or metal material(s) or combination of these materials.

DETAILED DESCRIPTION

Figure 1:
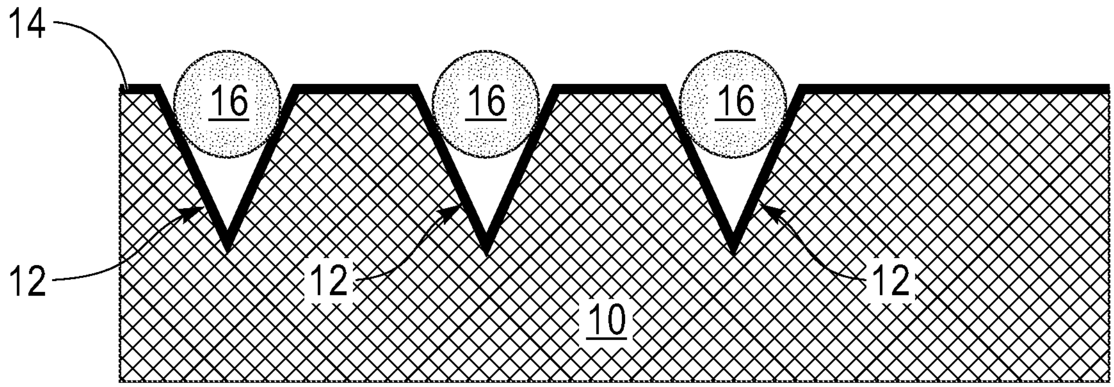
FIG. 1 is a cross sectional view of a co-package optics structure in accordance with a first embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

As stated above, co-package optics structures are provided in which an electromagnetic radiation absorption material layer is used to attach an optical link and/or waveguide structure to a coupling area that is located on a photonic integrated chip. The electromagnetic radiation absorption material layer is compatible with the other components of the co-package optics structures and can provide permanent or a non-permanent attachment between the optical link and/or waveguide structure and the coupling area of the photonic integrated chip. In the non-permanent embodiment, testing can be performed to determine whether the optical link and/or waveguide structure is defective, and if determined to be defective, the defective optical link and/or waveguide structure can be replaced by a replacement optical link and/or waveguide structure by removing the electromagnetic radiation absorption material layer that attaches the defective structure.

Reference is first made to FIG. 1, which illustrates a co-package optics structure in accordance with a first embodiment of the present application. In the first embodiment of the present application, the co-package optics structure includes a photonic integrated chip 10 that includes at least one coupling area. In the present application, the at least one coupling area defines an area of the photonic integrated chip 10 in which an optical link and/or waveguide structure can be attached thereto. The at least one coupling area is typically an adiabatic coupling area, i.e., an area in which coupling can occur without loss or gain of heat.

Figure 3:
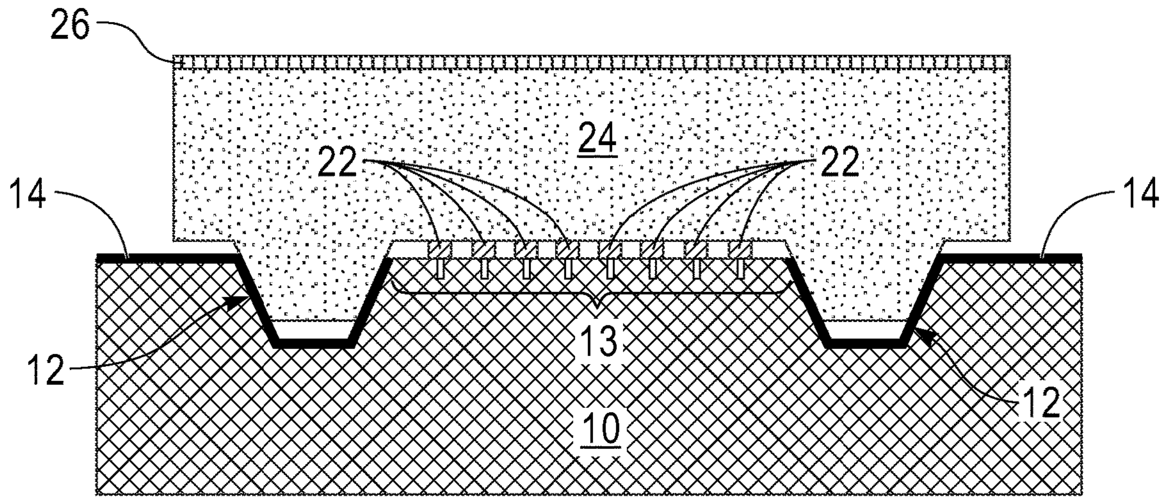
FIG. 3 is a cross sectional view of a co-package optics structure in accordance with a second embodiment of the present application.

In the present application, that at least one coupling area can be present in the photonic integrated chip 10, on a horizontal surface of the photonic integrated chip 10, or in the photonic integrated chip 10 and on a horizontal surface of the photonic integrated chip 10. In some embodiments, the at least one coupling area can be a V-groove 12 that is formed into the photonic integrated chip 10 as is illustrated in the embodiment shown in FIG. 1 of the present application. In other embodiments (as illustrated in FIG. 3), the one coupling area can be located on a planar horizontal surface of the photonic integrated chip 10. In yet other embodiments, the at least one coupling area can include a combination of at least one V-groove and a planar horizontal surface of the photonic integrated chip 10 (also seen in FIG. 3).

In the present application, the photonic integrated chip 10 is a microchip containing two or more photonic components which form a functioning circuit. The photonic integrated chip 10 detects, generates, transports, and processes light. Photonic integrated chips utilize photons (or particles or waves of light) as opposed to electrons that are utilized by electrical integrated circuit chips. One major difference between the two is that a photonic integrated chip provides functions for information signals imposed on optical wavelengths typically in the visible spectrum or near infrared (850-1650 nm). The photonic integrated chip 10 that can be used in the present application can vary and is not limited to any specific photonic integrated chip type. The photonic integrated chip 10 can be formed utilizing techniques that are well known to those skilled in photonics and other related industries.

Referring back to FIG. 1, the illustrated co-package optics structure further includes an electromagnetic radiation absorption material layer 14 located in close proximity to the at least one coupling area. In the present application, the phrase “in close proximity to” is used to denote that the electromagnetic radiation absorption material layer 14 is present in the at least one coupling area, or the electromagnetic radiation absorption material layer 14 is located a distance of less than 1 nm to 1000 nm or less from the at least one coupling area such as V grooves 12, but may be 0.1 mm to 10 mm away from a coupling area such as for a planar horizontal surface. In embodiments, the electromagnetic radiation absorption material layer 14 can be present in the V-grooves 12 and on the planar horizontal surface of the photonic integrated chip 10.

In the present application, the electromagnetic radiation absorption material layer 14 can provide permanent or non-permanent attachment of an optical link and/or wave guide structure to the at least one coupling area. Thus and when the electromagnetic radiation absorption material layer 14 is used for non-permanent attachment, the electromagnetic radiation absorption material layer 14 can be referred to as a release layer. The term “release layer” is used throughout the present application to denote a layer that can be removed after attachment of the optical link and/or waveguide structure to the at least one coupling area. The removal occurs after testing the attached optical link and/or waveguide structure to determine that the same is defective or non-defective. If a defective structure is attached to the at least one coupling area, the defective structure can be replaced by a replacement optical link or waveguide structure by removing (by ultra-violet, UV, or infrared light or laser) the electromagnetic radiation absorption material layer 14. This aspect of the present application will be described in greater detail herein below.

The electromagnetic radiation absorption material layer 14 of the present application is composed of a high electromagnetic (EM) absorption material. By “high electromagnetic absorption material” it is meant that the electromagnetic radiation absorption material layer 14 has an EM absorption typically greater than 50 to 90%. The high EM absorption material has an EM absorption that substantially matches a targeted release EM for subsequent rework. By “substantially matches” it is meant that the EM absorption of the EM absorption material is within ±10%, preferably ±5%, more preferably, ±2%, of the targeted EM for subsequent rework. Rework defines the process in which a defective optical link and/or waveguide structure is removed and replaced with another optical link and/or waveguide structure. In some embodiments of the present application, the electromagnetic radiation absorption material layer 14 can be composed of carbon, titanium, aluminum, copper, or any combination thereof.

In other embodiments of the present application, the electromagnetic radiation absorption material layer 14 includes an adhesive having electromagnetic radiation absorption particles embedded in a polymer matrix. The polymer matrix is as adhesive polymer matrix such as, for example, a polyimide based adhesive or an epoxy based adhesive. The electromagnetic radiation absorption particles are high EM absorption particles having an EM absorption that substantially matches a targeted release EM for subsequent rework. Examples of electromagnetic radiation absorption particles that can be used in the present application include, but are not limited to, carbon particles, titanium particles, aluminum particles, copper particles or any combination thereof. In embodiments of the present application, the electromagnetic radiation absorption particles can be homogeneously distribution throughout the polymer matrix or the electromagnetic radiation absorption particles can be non-homogeneously distribution throughout the polymer matrix.

In any of the embodiments mentioned above, the electromagnetic radiation absorption material layer 14 can be formed in close proximity to the at least one coupling area utilizing a deposition technique that is well known to those skilled in the art. Examples of some deposition techniques that can be used to form the electromagnetic radiation absorption material layer 14 in close proximity to the least one coupling area include, but are not limited to, chemical vapor deposition (CVD) physically enhanced chemical vapor deposition (PECVD), spin on coating deposition, or sputtering. The electromagnetic radiation absorption material layer 14 can be a continuous or a non-continuous layer. The electromagnetic radiation absorption material layer 14 can have a thickness from less than 5 nm to 400 nm; although other thicknesses for the electromagnetic radiation absorption material layer 14 are contemplated and can be used in the present application as the thickness of the electromagnetic radiation absorption material layer 14.

In some embodiments (not shown in FIG. 1 but readily discernable therefrom), an adhesive can be formed on the electromagnetic radiation absorption material layer 14. In other embodiments, the adhesive can be omitted from the structure. When used, the adhesive includes any adhesive polymer such as, for example, a polyimide based adhesive or an epoxy based adhesive. The adhesive can be formed on the electromagnetic radiation absorption material layer 14 utilizing deposition techniques that are well known to those skilled in the art. Examples of some deposition techniques that can be used to form the adhesive on the electromagnetic radiation absorption material layer 14 include, but are not limited to, wafer spin on adhesive, sheet adhesive, or alternate deposition. In other embodiments, the adhesive can be formed on the optical link and/or waveguide structure and the adhesive that is present on the optical link and/or waveguide structure is placed on the electromagnetic radiation absorption material layer 14 that is in close proximity to the at least one coupling area. The adhesive can be a continuous or a non-continuous layer. The adhesive can have a thickness from less than 1 μm to 80 μm; although other thicknesses for the adhesive are contemplated and can be used in the present application as the thickness of the adhesive. For applications using a release layer and an adhesive, the post ablation of the release layer of combined release layer/particles embedded in an adhesion layer may require post separation cleaning such as a chemical solvent clean (NMP), water clean, plasma clean ($N_2$, Ar, $O_2$ or alternate) and may require an oxygen ash or combinations of clean to remove any residue from the release layer and/or adhesive layer.

Referring back again to FIG. 1, the illustrated co-package optics structure further includes an optical link 16 contacting the electromagnetic radiation absorption material layer 14 that is present in close proximity to the at least one coupling area. In some embodiments and as is illustrated in FIG. 1, the optical link 16 is in direct physical contact with the electromagnetic radiation absorption material layer 14. In other embodiments (not illustrated in FIG. 1 but readily discernible from FIG. 1), the optical link 16 is in direct physical contact with an adhesive that is contacts the electromagnetic radiation absorption material layer 14. In some embodiments of the present application, the optical link 16 is a glass fiber in which one end of the glass fiber optical link structure is attached to the at least one coupling area of the photonic integrated chip; the other end of the glass fiber optical link structure can be present in a ferule or other housing structure.

Figure 2A:
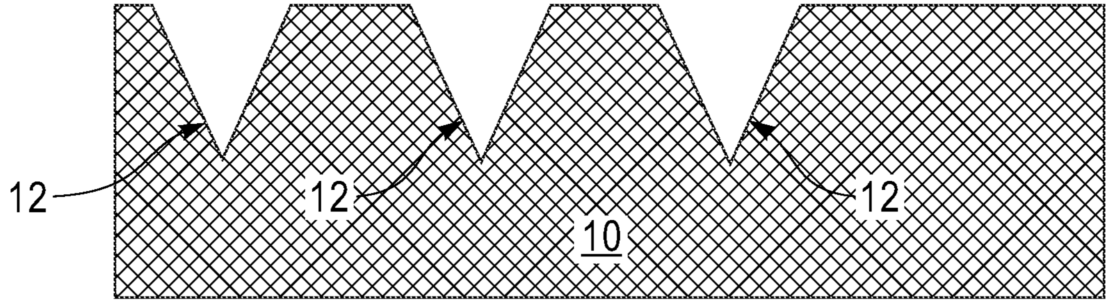
FIGS. 2A-2E are cross sectional views illustrating a method of the present application that can be used in providing a co-package optics structure in accordance with the first embodiment of the present application.

Reference is now made to FIGS. 2A-2E which illustrate a method of the present application that can be used in providing the co-package optics structure in accordance with the first embodiment of the present application that is shown in FIG. 1 above. Specifically, FIG. 2A illustrates a photonic integrated chip 10, as defined above, that includes at least one V-groove 12 as a coupling area. The at least one V-groove 12 has a shape of the letter "V". The at least one V-groove 12 can be formed into the photonic integrated chip 10 utilizing etching techniques that are well known to those skilled in the art. The etching techniques can include a crystallographic etch or any other etching process that can provide a V-groove 12 into the photonic integrated chip 10.

Figure 2B:
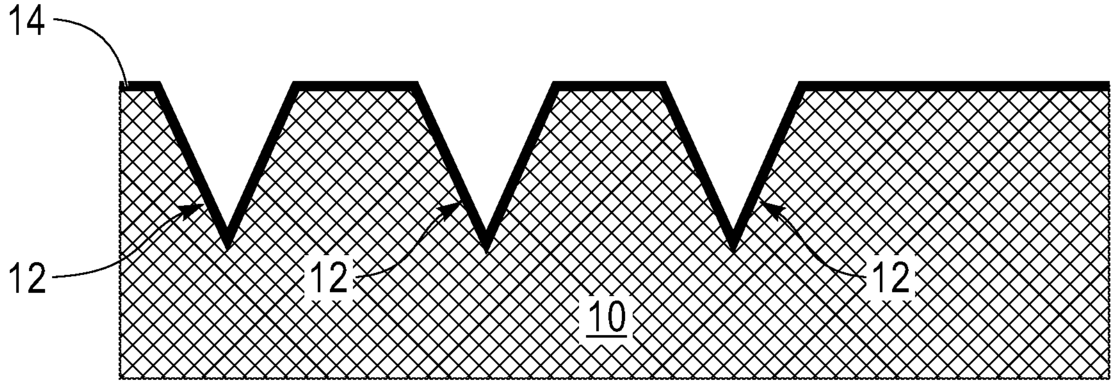

Referring now to FIG. 2B, there is illustrated the structure of FIG. 2A after forming electromagnetic radiation absorption material layer 14, as defined above. The electromagnetic radiation absorption material layer 14 can be formed utilizing a deposition process including one of the deposition processes mentioned above. In some embodiments (not shown), an adhesive, as defined above can be formed on the electromagnetic radiation absorption material layer 14 prior to providing the optical link 16 to the structure. In other embodiments, the adhesive is present on the optical link 16 and then placed in contact with the electromagnetic radiation absorption material layer 14.

Figure 2C:
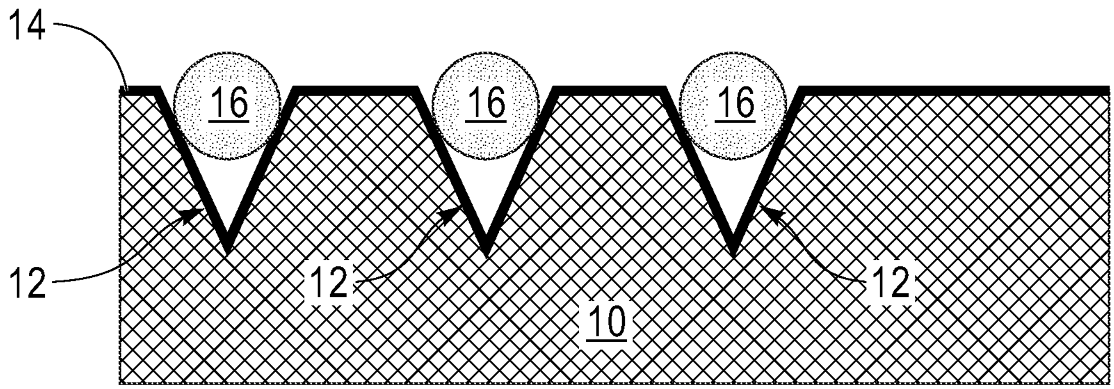
Figure 2D:
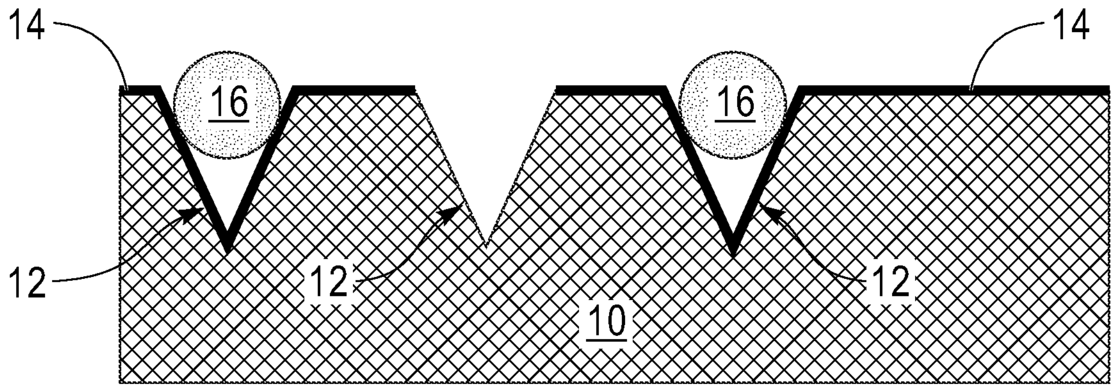

Referring now to FIG. 2C, there is illustrated the structure of FIG. 2B after placing the optical link 16 (e.g., glass fiber) with, or without an adhesive, in contact with the electromagnetic radiation absorption material layer 14. At this junction of the present application, the optical links 16 can be tested to determine if any of the optical links 16 are defective (i.e., faulty). The testing can include sending laser light and measuring the transmission of light in the link at a range of wavelengths and to characterize the signal transmission and/or insertion losses of light for each channel to determine if the optical link meets targeted transmission and loss targets for the application. If an optical link 16 is determined to be defective, the defective optical link 16 can be removed and replaced by a replacement optical link 20. The replacing includes a rework process in which the defective optical link 16 is removed by ablating the electromagnetic radiation absorption material layer 14 that contacts the defective optical link 16 from the at least one coupling area. The ablating can be performed by UV or IR light or by laser ablation. This aspect of the present application is shown in FIG. 2D. This process can be followed by any well-known cleaning process. For applications using a release layer and an adhesive, the post ablation of the release layer of combined release layer/particles embedded in an adhesion layer may require post separation cleaning such as a chemical solvent clean (NMP), water clean, plasma clean ($N_2$, Ar, $O_2$ or alternate) and may require an oxygen ash or combinations of clean to remove any residue from the release layer and/or adhesive layer.

Figure 2E:
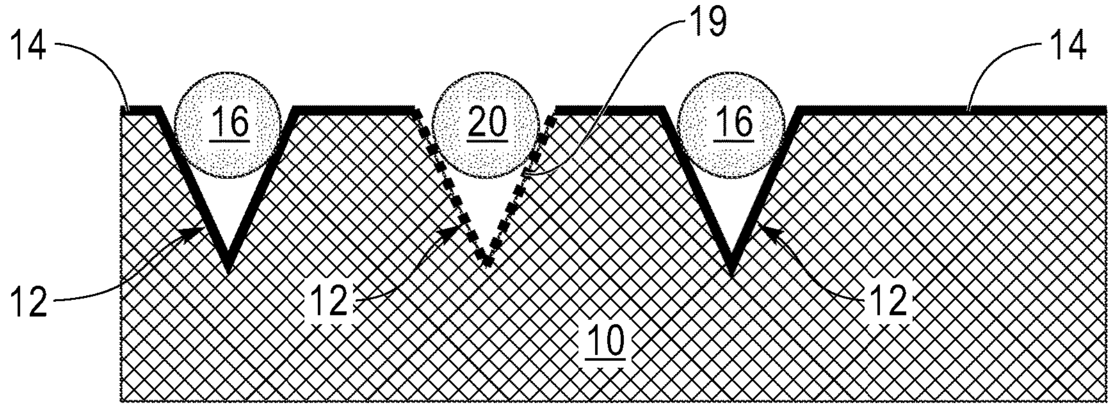

Next, and as shown in FIG. 2E, a replacement optical link 20 (e.g., glass fiber) can be attached to the coupling area that included the previous defective optical link. In the present application, the replacement optical link 20 can be formed by forming another electromagnetic radiation absorption material layer 19 without or without an adhesive, in the coupling area in which the previous electromagnetic radiation absorption material layer 14 was removed therefrom by ablation. Testing can be repeated to ensure that the replacement optical link 20 is not defective. If the replacement optical link 20 is defective, the rework process mentioned above can be repeated. If the replacement optical link 20 is not defective, the structure can be subject to a curing process. Curing can be performed by UV curing and/or thermal curing.

Referring now to FIG. 3, there is illustrated a co-package optics structure in accordance with a second embodiment of the present application. Notably, FIG. 3 illustrates a co-package optics structure including photonic integrated chip 10 including at least one coupling area. In the second embodiment, the at least one coupling area is a planar horizontal surface 13 of the photonic integrated chip 10. In this embodiment, electromagnetic radiation absorption material layer 14 as defined above is located on a first surface of the photonic integrated chip and in close proximity to the at least one least one coupling area. In this embodiment, at least one waveguide structure 22 is contacting the electromagnetic radiation absorption material layer 14 that is present on the first surface of the photonic chip and in close proximity to the at least one least one coupling area. In the present application, the waveguide structures 22 are optical waveguide structures that guide electromagnetic waves in the optical spectrum. When multiple waveguide structures 22 are present they can be arranged in an array. In some embodiments, the co-package optics structure shown in FIG. 3 can further include another waveguide structure 24 including a stiffener layer 26 located above the at least one waveguide structure 22.

In this embodiment, the electromagnetic radiation absorption material layer 14 is the same as the electromagnetic radiation absorption material layer 14 shown in FIG. 1. An adhesive layer as defined above can be located between the waveguide structures 22 and the electromagnetic radiation absorption material layer 14.

In the second embodiment illustrated in FIG. 3, the at least one waveguide structure is a fan-out optical waveguide structure. The term "fan-out optical waveguide structure" is used in the present application to denote an example of having multiple waveguides that are attached to the photonic chips with tight pitch such as less than 250 μm pitch (examples can be 50 μm pitch, 25 μm pitch or alternate pitch) and then can be fanned out to match a pitch of 250 μm (or alternate pitch of about 125 μm or other size) as an example for waveguide to glass fiber array such as when using a pluggable ferrule connector.

In the second embodiment, the at least one waveguide structure 22 is a polymer optical waveguide, a glass waveguide, a silicon dioxide waveguide or a silicon nitride waveguide. Combinations of said waveguide structures can also be used as the at least one waveguide structure 22. The at least one waveguide structure 22 can be formed utilizing techniques well known to those skilled in the art and the at least one waveguide structure 22.

The another waveguide structure 24, which is larger in size than the individual waveguide structure 22, includes one of the types of waveguides mentioned above for the at least one waveguide structure 22. The stiffener layer 26 can be composed of glass, a semiconductor material such as, for example, silicon, or a metal such as, for example, copper. The stiffener layer 26 can be formed on the another waveguide structure 24 utilizing techniques including deposition and bonding that are well known to those skilled in the art.

The co-package optics structure illustrated in FIG. 3 can be formed utilizing the same basic processes steps as shown in FIGS. 2A-2E above. In forming the co-package optics structure illustrated in FIG. 3, it is possible to replace a defective waveguide structure 22 with a glass fiber or at least one other waveguide structure. In such an embodiment, a coupling material such as another electromagnetic radiation absorption material layer and/or an adhesive can be used.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A co-package optics structure comprising:

a photonic integrated chip including at least one coupling area;

an electromagnetic radiation absorption material layer located in close proximity to the at least one coupling area; and an optical link contacting the electromagnetic radiation absorption material layer that is present in close proximity to the at least one coupling area, wherein the photonic integrated chip includes at least one other coupling area located therein, wherein a replacement optical link or a waveguide array is present in the at least one other coupling area and adhered to a surface of the at least one other coupling area by a coupling material.

2. The co-package optics structure of claim 1, wherein the electromagnetic radiation absorption material layer is a release layer.

3. The co-package optics structure of claim 1, wherein the electromagnetic radiation absorption material layer is composed of carbon, titanium, aluminum, copper, or any other combination thereof that have high absorption for wavelength used to remove the electromagnetic radiation absorption material layer.

4. The co-package optics structure of claim 1, further comprising an adhesive located between the electromagnetic radiation absorption material layer and the optical link.

5. The co-package optics structure of claim 4, wherein the adhesive comprises a polyimide based adhesive or an epoxy based adhesive.

6. The co-package optics structure of claim 1, wherein the electromagnetic radiation absorption material layer comprises an adhesive having electromagnetic radiation absorption particles embedded in a polymer matrix.

7. The co-package optics structure of claim 6, wherein the electromagnetic radiation absorption particles comprise carbon particles, titanium particles, aluminum particles, copper particles or any combination thereof.

8. The co-package optics structure of claim 1, wherein the optical link comprises a glass fiber.

9. A co-package optics structure comprising:

a photonic integrated chip including at least one coupling area;

an electromagnetic radiation absorption material layer located on a first surface of the photonic integrated chip and in close proximity to the at least one least one coupling area; and at least one waveguide structure contacting the electromagnetic radiation absorption material layer that is present on the first surface of the photonic chip and in close proximity to the at least one least one coupling area, wherein the photonic integrated chip includes at least one other coupling area located therein, wherein one or more glass fibers or at least one other waveguide structure is adhered to a surface of the at least one other coupling area by a coupling material.

10. The co-package optics structure of claim 9, wherein the electromagnetic radiation absorption material layer is a release layer.

11. The co-package optics structure of claim 9, wherein the electromagnetic radiation absorption material layer is composed of carbon, titanium, aluminum, copper or any combination thereof.

12. The co-package optics structure of claim 9, further comprising an adhesive located between electromagnetic radiation absorption material layer and the waveguide structure.

13. The co-package optics structure of claim 12, wherein the adhesive comprises a polyimide based adhesive or an epoxy based adhesive.

14. The co-package optics structure of claim 9, wherein the electromagnetic radiation absorption material layer comprises an adhesive having electromagnetic radiation absorption particles embedded in a polymer matrix.

15. The co-package optics structure of claim 14, wherein the electromagnetic radiation absorption particles comprise carbon particles, titanium particles, aluminum particles, copper particles or any combination thereof.

16. The co-package optics structure of claim 9, wherein the at least one waveguide structure is a fan-out optical waveguide structure.

17. The co-package optics structure of claim 9, wherein the at least one waveguide structure is a polymer optical waveguide, a glass waveguide, a silicon dioxide waveguide, a silicon nitride waveguide or any combination thereof.

18. The co-package optics structure of claim 9, further comprising another waveguide structure and a stiffener layer located above the at least one waveguide structure.

19. A co-package optics structure comprising:

a photonic integrated chip including at least one coupling area;

an electromagnetic radiation absorption material layer located in close proximity to the at least one coupling area; and a structure comprising an optical link or at least one waveguide and contacting the electromagnetic radiation absorption material layer that is present in close proximity to the at least one coupling area, wherein the electromagnetic radiation absorption material layer comprises a release layer, an adhesive having electromagnetic radiation absorption particles embedded in a polymer matrix, or carbon.

* * * * *